United States Patent [19]

Juang

[11] Patent Number: 4,612,414

[45] Date of Patent: Sep. 16, 1986

[54] SECURE VOICE TRANSMISSION

[75] Inventor: Biing-Hwang Juang, Lincroft, N.J.

[73] Assignee: AT&T Information Systems Inc., Middletown, N.J.

[21] Appl. No.: 527,962

[22] Filed: Aug. 31, 1983

[51] Int. Cl.[4] .............................................. H04M 1/70

[52] U.S. Cl. .................................. 179/1.5 R; 381/51; 178/22.13

[58] Field of Search .............. 179/1.5 R, 1.5 S, 1.5 E; 178/22.23, 22.14; 381/41, 43, 51, 36

[56] References Cited

U.S. PATENT DOCUMENTS

| | | | |
|---|---|---|---|
| 3,786,188 | 1/1974 | Allen | 381/36 |
| 4,330,689 | 5/1982 | Kang et al. | 381/36 |
| 4,360,708 | 11/1982 | Taguchi et al. | 381/36 |
| 4,401,855 | 8/1983 | Broderson et al. | 381/41 |
| 4,486,899 | 12/1984 | Fushikida | 381/36 |
| 4,491,958 | 1/1985 | Vmemura et al. | 381/51 |

OTHER PUBLICATIONS

"Linear Prediction: A Tutorial Review," *Proc. of the IEEE*, J. Makhoul, 1975, pp. 561-580.

"Privacy and Authentication: An Introduction to Cryptography," *Proc. of the IEEE*, W. Diffle et al., 1979, pp. 397-427.

"Speech Coding Based Upon Vector Quantization," *IEEE Transactions on Acoustics, Speech & Signal Proc.*, A. Buzo et al., 1980, pp. 562-574.

"A Comparison of Four Methods for Analog Speech Privacy," *IEEE Transactions on Communications*, N. S. Jayant et al., 1981, pp. 18-23.

"Distortion Performance of Vector Quantization for LPC Voice Coding," *IEEE Transactions on Acoustics, Speech & Signal Proc.*, B. Juang et al., 1982, pp. 294-304.

*Primary Examiner*—Salvatore Cangialosi
*Assistant Examiner*—Aaron J. Lewis
*Attorney, Agent, or Firm*—Ronald D. Slusky

[57] ABSTRACT

Voice signals are transmitted over a voiceband telephone channel with a high degree of security and good voice quality by applying to the transmission channel a first signal which includes digital information derived from the vocal tract response of the signal and a second signal which includes continuous information derived from the excitation component of the voice signal.

30 Claims, 2 Drawing Figures

SECURE VOICE TRANSMISSION

BACKGROUND OF THE INVENTION

The present invention relates to secure voice transmission.

The effort expended in searching for effective secure voice communication techniques has been considerable, especially in recent years. For example, many analog secure voice techniques, or speech scramblers, have been proposed and widely discussed. See, for example, N. S. Jayant et al, "A Comparison of Four Methods for Analog Speech Privacy", *IEEE Trans. Comm.*, Vol. COM-29, No. 1, January 1981, and references cited therein. There is, however, a general consensus that digital encryption techniques, such as described in W. Diffie and M. E. Hellman, "Privacy and Authentication: An Introduction to Cryptography", *Proceedings IEEE*, Vol. 67, pp. 397–427, March 1979, are more effective from the cryptanalytical point of view. That is, they provide much greater security from either casual or intentional eavesdropping. A fundamental drawback of digital encryption, however, is that toll quality transmission of encrypted speech cannot be achieved at the data rates afforded by current voice band data technology. At best, only "adequate" speech quality can be achieved.

SUMMARY OF THE INVENTION

The present invention is directed to a voice communication technique which provides for the transmission of voice signals over voiceband channels with a high degree of security and with a voice quality that has been heretofore achieved only with channels of substantially greater bandwidth. As in techniques known in the prior art, the voice signal is divided into two components—the vocal tract response and the excitation signal. In the prior art, however, both the vocal tract response and the excitation signal are conveyed over the transmission channel via signals in which the vocal tract response information and excitation signal information are both represented in digital form. In accordance with the invention, by contrast, the excitation signal is conveyed via information represented in the transmitted signal in continuous form.

In an illustrative embodiment of the invention, the excitation signal is scrambled and, in accordance with a feature of the invention, an intelligibility remaining in the scrambled excitation signal is masked by filtering same using an arbitrary vocal tract response selected from a predetermined codebook as a function of the vocal tract response.

DETAILED DESCRIPTION

Figure 1:
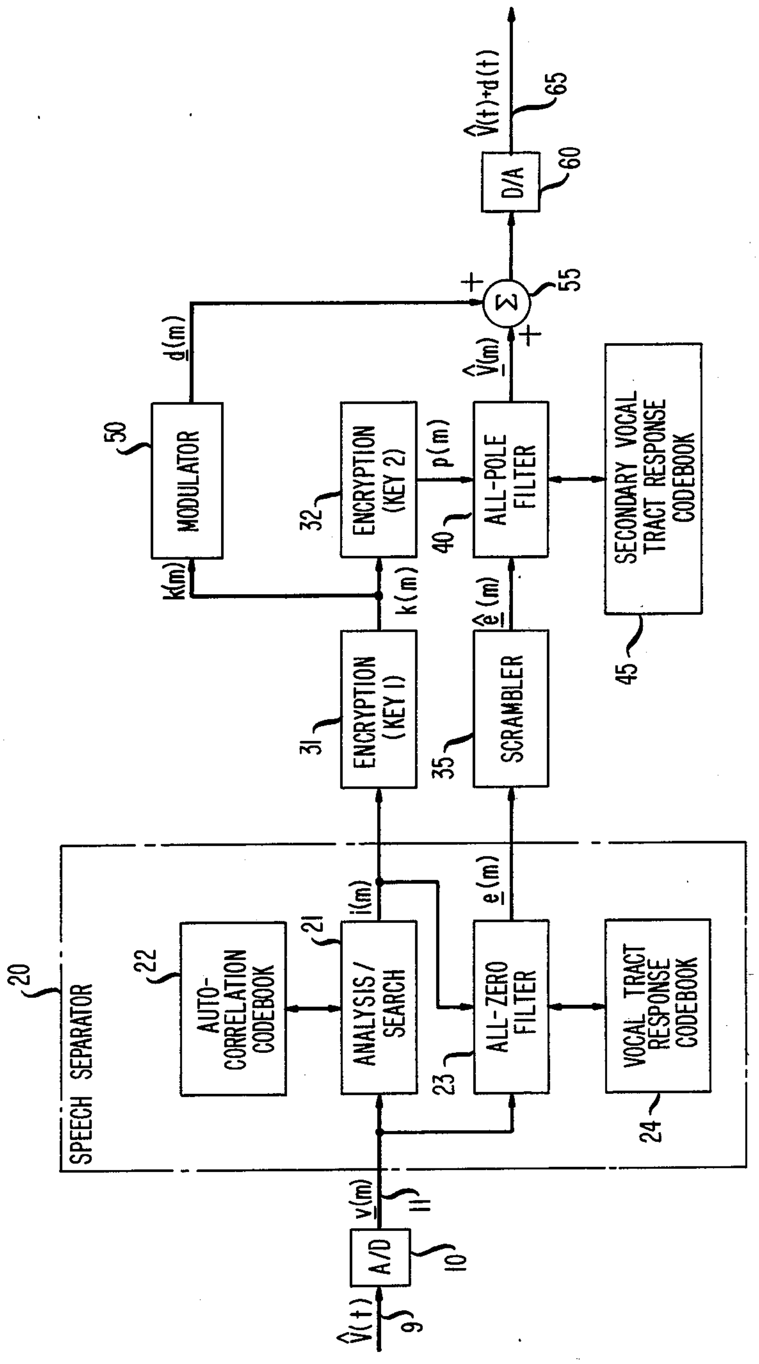
FIG. 1 is a block diagram of a transmitter for voice signals embodying the principles of the invention.
Figure 2:
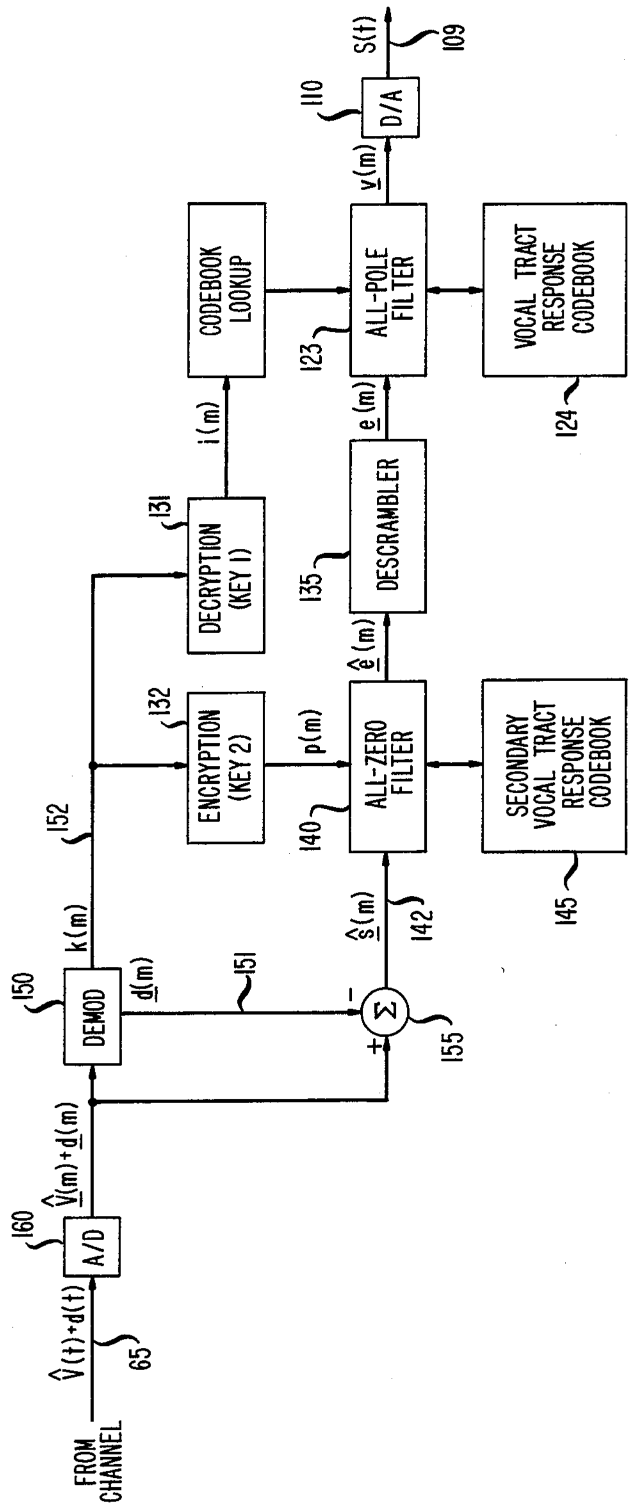
FIG. 2 is a block diagram of a receiver for voice signals embodying the principles of the invention.

In the transmitter of FIG. 1, a continuous voice signal V(t), which is to be encrypted and transmitted to the receiver of FIG. 2 via a voiceband telephone channel 65, is received on lead 9 and applied to A/D converter 10. The latter generates on lead 11 12-bit digital voice samples at a rate of 8 KHz, which it applies to speech separator 20.

Speech can be modeled as the output of a linear system in which a vocal tract response, in the form of an all-pole filter, is driven by an excitation signal—hereinafter also referred to simply as the "excitation"—that has essentially a flat spectral envelope, and speech separator 20 operates on the basis of this characterization. In particular, speech separator 20 processes the voice signals in 20 ms frames each comprised of N=160 voice samples, the N samples of the $m^{th}$ frame being represented as a vector v(m), to generate signals representing, or indicative of, the vocal tract response and excitation signal for each voice sample frame.

More specifically, speech separator 20 includes an analysis/search circuit 21 and an autocorrelation codebook 22. The codebook, which is illustratively realized as a read-only memory (ROM), contains 1024 vectors $r_j$, $j=1, 2, \ldots 1024$, of length eleven. Each of these vectors comprises the autoccorrelation of a different possible speech sound of 20 ms duration and, in the aggregate, the 1024 vectors reasonably well encompass the autocorrelations of all possible 20 ms segments of human speech. A technique for generating codebook 22 is described, for example, in B. Juang et al, "Distortion Performance of Vector Quantization for LPC Voice Coding," *IEEE Trans. Acoustics, Speech and Signal Processing*, Vol. ASSP-30, No. 2, April, 1982, pp. 294–304, hereby incorporated by reference.

Analysis/search circuit 21 calculates for the $m^{th}$ voice sample frame, v(m), an autocorrelation vector $r_v(m)$ of length eleven. It then uses vector quantization such as described in A. Buzo et al, "Speech Coding Based Upon Vector Quantization," *IEEE Trans. Acoustics, Speech and Signal Processing*, Vol. ASSP-28, No. 5, October 1980, pp. 562–574, hereby incorporated by reference, to determine which entry within codebook 22 most closely matches the autocorrelation vector just generated. Circuit 21 then generates an index identifying that vector, the index generated for the $m^{th}$ voice sample frame being denoted i(m).

Analysis/search circuit 21 illustratively comprises two microprocessors, one of which generates $r_v(m)$ and the other of which searches the codebook for the closest match. Use of two microprocessors is desirable, given current microprocessor technology, in order to preform all the required processing in real time. Both steps can, however, be performed by a single microprocessor if its processing speed is sufficiently fast.

Each vector of autocorrelation terms $r_j$, $j=1, 2 \ldots 1024$, in codebook 22 has a corresponding vocal tract response, which can be expressed as a vector $a_j$ whose components are the coefficients of the above-mentioned speech model all-pole filter. In particular, the relationship between the $r_j$'s and the $a_j$'s is established by a set of linear equations, known as the normal equations or Yule-Walker equations. See J. Makhoul, "Linear Prediction: A Tutorial Review", *Proceedings IEEE* 63, pp. 561–580, 1975. Thus the value of index i(m) can be understood as identifying not only a particular autocorrelation vector $r_{i(m)}$, but also a particular vocal tract response $a_{i(m)}$.

The vocal tract response information represented by the stream of indices i(m), m=0, 1, 2, . . . , is applied within speech separator 20 to all-zero digital filter 23. The latter is illustratively realized as another microprocessor and has an associated read-only memory codebook 24. This codebook contains the aforementioned vocal tract response vectors $a_j$, $j=1, 2, \ldots, 1024$. As each index i(m) is applied to filter 23, the vector $a_{i(m)}$ is retrieved from codebook 24 and the components of the vector are used as the filter coefficients to filter voice sample frame v(m). The output of filter 23 is a frame of N samples, these being samples of that portion of the aforementioned excitation signal associated with the $m^{th}$ voice sample frame v(m). In particular, the $m^{th}$ such frame of excitation signal samples is represented by the vector e(m) and is hereinafter referred to as an excitation frame.

In addition to being applied to filter 23, the vocal tract response information represented by the stream of indices i(m), m=0, 1, 2, . . . , is also applied, as in the prior art, to encryption circuit 31 to form a stream of encrypted indices k(m), m=0, 1, 2 . . . . Circuit 31 is illustratively an off-the-shelf component which implements the conventional Data Encryption Standard utilizing a selected encryption key, denominated KEY 1. As will be seen, the encrypted vocal tract response information represented by indices k(m), m=0, 1, 2 . . . , is represented in the transmitted signal in digital form.

In the prior art, the excitation signal, or information derived therefrom—such as an encrypted version of samples of the excitation signal—is also represented in the transmitted signal in digital form by transmitting the values of those encrypted samples. In accordance with the present invention, by contrast, the excitation signal, or information derived therefrom, is represented in the transmitted signal in continuous form. (Although in the prior art the excitation signal samples may be applied to a continuous, or analog, carrier, the information itself is still represented digitally, i.e., in the form of discrete rather than continuous, carrier signal changes.) Following the approach of the invention provides a voice communication technique wherein the vocal tract response information and excitation information can be transmitted together over a voiceband telephone channel, or other limited-bandwidth channel, with substantially better voice quality than has been heretofore achieved over a channel of like bandwidth using the prior art all-digital approach.

In particular, a scrambled excitation frame ê(m) is generated in response to excitation frame e(m) by scrambler 35 at the same time that encrypted index k(m) is being generated. (Scrambler 35 may be any known type of circuit for scrambling analog signal samples.) In preferred embodiments of the invention, the scrambled excitation frame ê(m) is further processed in an all-pole filter 40 in accordance with a feature of the invention, as described hereinbelow, to mask any intelligibility remaining therein. For the present, however, it suffices to concentrate on the output of filter 40.

In particular, the output of filter 40 is a frame of N samples $\hat{V}$(m) representing a scrambled and filtered version of the excitation frame e(m). As the result of the operation of the conventional anti-aliasing filter (not shown) in A/D converter 10, scrambled/filtered excitation frame $\hat{V}$(m) has a baseband spectrum that, in this system, extends from about 300 Hz to about 3000 Hz. This leaves a window at the top of the telephone voiceband spectrum of about 200 Hz—from about 3100 Hz to about 3300 Hz. A frame of N samples d(m) representing the encrypted index k(m) and having its spectrum within that window is generated by a modulator 50, and is combined with frame $\hat{V}$(m) in an adder 55. In this way, the vocal tract response information and the excitation signal information are frequency-division multiplexed into the voiceband telephone bandwidth of 300–3300 Hz. The output of adder 55 is converted to analog form by D/A converter 60, whose output signal, $\hat{V}$(t)+d(t), carries continuous excitation signal information, in accordance with the invention, as well as the vocal tract response information. The signal $\hat{V}$(t)+d(t) is applied to channel 65.

As previously noted, scrambled excitation frame ê(m) is processed in all-pole filter 40 to mask any intelligibility remaining therein, in accordance with a feature of the invention. In particular, a second encrypted version of the index i(m), denoted p(m), is generated by applying encrypted index k(m) to a second encryption circuit 32. The latter is illustratively identical to encryption circuit 31 but utilizes a different encryption key, denominated KEY2. Encrypted index p(m) is then used to address a secondary vocal tract response codebook having vector entries $a'_j$, j=1, 2, . . . 1024. Codebook 45 may be identical to codebook 24; or it may have the same entries as codebook 24, but in a different order; or it may have totally different entries which have been generated in any arbitrary way. In any case, the $p(m)^{th}$ entry of codebook 45 is applied to all-pole filter 40. The latter generates frame $\hat{V}$(m) by filtering scrambled excitation frame ê(m) using the components of $a'_{p(m)}$ as the filter coefficients. With such processing, it is as though the speaker's excitation, i.e., modulated airflow, were being passed through, and thus filtered by, a wholly random vocal tract whose changes from one frame to the next are also wholly arbitrary and bear no relationship to the way in which vocal tract actually changed—or, in fact, could have changed—in successive frames. However, since the filter characteristic defined by vector $a'_{p(m)}$ is a function, ultimately, of encrypted index k(m), then scrambled excitation frame e,cir/e/(m) will be able to be recovered from frame $\hat{V}$(m) in the receiver once encrypted index k(m) has been recovered therein.

As shown in FIG. 2, the signal received from channel 65 is the transmitted signal $\hat{V}$(t)+d(t) (To facilitate the present description, the signals in the receiver of FIG. 2 bear the same designations as the corresponding signals in the transmitter, even though there inevitably will have been at least some distortion induced by the channel so that, strictly speaking, the transmitted and received signals are not the same.) The signal $\hat{V}$(t)+d(t) is converted to 12-bit digital form at an 8 KHz rate by A/D converter 160 to provide the sampled signal $\hat{V}$(m)+d(m). The sampled signal, in turn, is applied to demodulator 150 which operates on that portion of the signal whose spectrum lies in the range 3100–3000 Hz to (a) recover encrypted index k(m) and provide it on lead 152, and (b) extract frame d(m) and provide the samples which comprise it on lead 151. The latter extends to the subtrahend input of a subtractor 155, the minuend input of which receives the signal $\hat{V}$(m)+d(m). The output of subtractor 140 is thus scrambled/filtered excitation frame $\hat{V}$(m).

At the same time, encrypted index k(m) is applied to encryption circuit 132, which is illustratively identical to, and uses the same encryption key as, encryption circuit 32 in the transmitter. The output of encryption circuit 132 is thus encrypted index p(m), which is used as an address for secondary vocal tract response codebook 145. Codebook 145, more particularly, is identical to codebook 45 in the transmitter. Thus, the $p(m)^{th}$ entry in codebook 145 is the same vocal tract response vector $a'_{p(m)}$ whose components were used in the transmitter as the coefficients of all-pole filter 40 to generate frame $\hat{V}$(m) from scrambled excitation frame ê(m). In the receiver, however, the inverse of that filtering is performed. That is, the components of vector $a'_{j(m)}$ are used as the filter coefficients of an all-zero filter 140, which filters frame $\hat{S}$(m) to provide scrambled excitation frame ê(m). The latter is then descrambled in descrambler 135 to recover excitation frame e(m).

Meanwhile, encrypted index k(m) is also being applied to decryption circuit 131 which decrypts k(m) using the key KEY1 to recover index i(m). The latter is then used as an address for vocal tract response codebook 124. Codebook 124, more particularly, is identical to codebook 24 in the transmitter. Thus the $i(m)^{th}$ entry in codebook 124 is the same vocal tract response vector $a_{i(m)}$ whose components were used in the transmitter as the coefficients of all-zero filter 23 to generate excitation frame e(m) from voice sample frame v(m). Here again, however, the inverse filtering is performed. That is, the components of vector $a_{i(m)}$ are used as the filter coefficients of an all-pole filter 123 which filters the excitation frame e(m) at the output of descrambler 135 to recover voice sample frame v(m). The latter is then converted back to analog form by D/A converter 110 to provide the original continuous voice signal V(t).

The foregoing merely illustrates the principles of the invention. For example, any of various schemes could be used in the receiver to recover at least a portion of the vocal tract information that is embedded in frame $\hat{V}$(m) by virtue of the filtering performed in filter 40. In devising such a scheme, account must be taken of the fact that, as a result of noise and distortion in the channel, it may not be possible to accurately recover from frame $\hat{V}$(m) all the bits of the index that was used to generate frame $\hat{V}$(m) from frame ê(m). Some of the bits thereof can be accurately recovered, however. One approach would be to arrange the entries in codebook 45 in the transmitter in (say) 32 groups each corresponding to that group of values of encrypted index p(m) whose five most significant bits are the same, and with the members of each group of entries in the codebook being as far away from one another in Euclidean space as possible. As to the five least significant bits of each encrypted index, they can be transmitted in digital form using frequency division multiplexing as described above. This approach has the advantage that less bandwidth will be required to transmit the digital information. It is also advantageous in that it splits up the encrypted index information into two parts, thereby providing enhanced protection against cryptanalysis.

Other variations are possible. For example, for applications in which a lesser degree of security is adequate, a number of simplifications to the illustrative embodiment can be made. For example, the various vocal tract response codebooks can be identical to one another; encrypted index k(m), rather than a separate encrypted index p(m), can be used to address codebook 45; and filtering of scrambled excitation frame ê(m) can be eliminated. In an even more basic implementation, the index encryption and/or scrambling steps can also be eliminated.

As to the circuit implementation, it will be appreciated that a number of the components depicted in each FIG. as separate elements can be time-shared. Indeed, in a complete transceiver embodying the invention, various components can be time-shared between the transmitter and receiver sections thereof.

It will thus be appreciated that those skilled in the art will be able to devise numerous arrangements which, although not explicitly set forth herein, embody the principles of the invention.

What is claimed is:

1. Apparatus comprising first means for applying to a transmission channel a first signal which includes information indicative of the vocal tract response of a voice signal, and second means for applying to said transmission channel a second signal which includes information indicative of the excitation component of said voice signal, said excitation information being represented in said second signal in continuous form.

2. The invention of claim 1 wherein said first and second means jointly include means for frequency division multiplexing said first and second signals.

3. The invention of claim 1 wherein said vocal tract response information is encrypted.

4. Apparatus comprising first means for applying to a transmission channel a first signal which includes information indicative of the vocal tract response of a voice signal, and second means for applying to said transmission channel a second signal which includes scrambled information indicative of the excitation component of said voice signal, said excitation information being represented in said second signal in continuous form.

5. The invention of claim 4 wherein said first and second means jointly include means for frequency division multiplexing said first and second signals.

6. The invention of claim 4 wherein said vocal tract response information is encrypted.

7. Apparatus comprising first means for applying to a transmission channel a first signal which includes information indicative of the vocal tract response of a voice signal, and second means for applying to said transmission channel a second signal which includes information indicative of the excitation component of said voice signal and filtered in accordance with a filter characteristic which is a function of said vocal tract response information, said excitation information being represented in said second signal in continuous form.

8. The invention of claim 7 wherein said first and second means jointly include means for frequency division multiplexing said first and second signals.

9. The invention of claim 7 wherein said vocal tract response information is encrypted.

10. Apparatus comprising first means for applying to a transmission channel a first signal which includes information indicative of the vocal tract response of a voice signal, and second means for applying to said transmission channel a seocnd signal which includes scrambled information indicative of the excitation component of said voice signal and filtered in accordance with a filter characteristic which is a function of said vocal tract response information, said excitation information being represented in said second signal in continuous form.

11. The invention of claim 10 wherein said first and second means jointly include means for frequency division multiplexing said first and second signals.

12. The invention of claim 11 wherein said vocal tract response information is encrypted.

13. Apparatus for processing successive frames of speech information, said apparatus comprising means for identifying for each one of said speech frames which one of a plurality of predetermined speech segments said one speech frame is most similar to and for providing an index associated with said one segment, means for generating a frame of information indicative of the excitation components of said one speech frame, and means for applying to a transmission channel a first signal indicative of said index and a second signal in which said frame of excitation information is represented in continuous form.

14. The invention of claim 13 wherein said generating means includes means for scrambling said excitation component to form a scrambled excitation component.

15. The invention of claim 14 wherein said generating means further includes means for filtering said scrambled excitation component with a filter characteristic associated with said index.

16. A method comprising the steps of applying to a transmission channel a first signal which includes information indicative of the vocal tract response of a voice signal, and applying to said transmission channel a second signal which includes information indicative of the excitation component of said voice signal, said excitation information being represented in said second signal in continuous form.

17. The invention of claim 16 wherein said applying steps jointly include the step of frequency division multiplexing said first and second signals.

18. The invention of claim 16 wherein said vocal tract response information is encrypted.

19. A method comprising the steps of applying to a transmission channel a first signal which includes information indicative of the vocal tract response of a voice signal, and applying to said transmission channel a second signal which includes scrambled information indicative of the excitation component of said voice signal, said excitation information being represented in said second signal in continuous form.

20. The invention of claim 19 wherein said applying steps jointly include the step of frequency division multiplexing said first and second signals.

21. The invention of claim 19 wherein said vocal tract response information is encrypted.

22. A method comprising the steps of applying to a transmission channel a first signal which includes information indicative of the vocal tract response of a voice signal, and applying to said transmission channel a second signal which includes information indicative of the excitation component of said voice signal and filtered in accordance with a filter characteristic which is a function of said vocal tract response information, said excitation information being represented in said second signal in continuous form.

23. The invention of claim 22 wherein said applying steps jointly include the step of frequency division multiplexing said first and second signals.

24. The invention of claim 22 wherein said vocal tract response information is encrypted.

25. A method comprising the steps of applying to a transmission channel a first signal which includes information indicative of the vocal tract response of a voice signal, and applying to said transmission channel a second signal which includes scrambled information indicative of the excitation component of said voice signal and filtered in accordance with a filter characteristic which is a function of said vocal tract response information, said excitation information being represented in said second signal in continuous form.

26. The invention of claim 25 wherein said applying steps jointly include the step of frequency division multiplexing said first and second signals.

27. The invention of claim 25 wherein said vocal tract response information is encrypted.

28. A method for processing successive frames of speech information, said method comprising the steps of identifying for each one of said speech frames which one of a plurality of predetermined speech segments said one speech frame is most similar to, providing an index associated with said one segment, generating a frame of information indicative of the excitation component of said one speech frame, and applying to a transmission channel a first signal indicative of said index and a second signal in which said frame of excitation information is represented in continuous form.

29. The invention of claim 28 wherein said generating step includes the step of scrambling said excitation component to form a scrambled excitation component.

30. The invention of claim 29 wherein said generating step includes the further step of filtering said scrambled excitation component with a filter characteristic associated with said index.

* * * * *